(No Model.)

T. SHEHAN.
DEVICE FOR LOCKING BARS.

No. 330,266. Patented Nov. 10, 1885.

Witnesses:

Inventor:
Thomas Shehan
by Marcellus Bailey
his attorney

UNITED STATES PATENT OFFICE.

THOMAS SHEHAN, OF CLEVELAND, ASSIGNOR OF ONE-THIRD TO JAMES T. BRADY, OF COLUMBUS, OHIO.

DEVICE FOR LOCKING BARS.

SPECIFICATION forming part of Letters Patent No. 330,266, dated November 10, 1885.

Application filed September 21, 1885. Serial No. 177,737. (No model.)

*To all whom it may concern:*

Be it known that I, THOMAS SHEHAN, of Cleveland, Ohio, have invented a certain new and Improved Device for Locking Bars or Rods, of which the following is a specification.

The object of this invention is to furnish simple and efficient means of locking a bar, whether cylindrical or of other shape in cross-section, in place in the socket or bearing formed for its reception in the piece by which it is to be supported or to which it is to be connected.

The invention has been designed more particularly with reference to the securing of the rounds of ladders or fire-escapes and the rails or bars of fences, but is applicable generally for the purpose of locking two parts or pieces of material together. For convenience sake, I will term the piece in which the socket or bearing is made the "support," and the piece which is to be inserted and locked in said socket or bearing the "bar." The socket or bearing in the support is of the size and shape of the end of the bar to be inserted therein.
This end of the bar has formed in it on one side a lateral recess, so that the bar when it is inserted in the socket as far as the recess, the latter will permit the bar to move laterally, so that the side of the socket adjoining the recess will enter and be held in the latter. When the parts are thus interlocked, there will be a space intervening between the unrecessed portion of the end of the bar and the walls of the socket adjoining the same, and this space is then filled by a device which may be termed, for convenience sake, a "filling-tongue," of appropriate shape, preferably wedge shape or tapering, which serves to hold the parts in their interlocked position, said tongue being fastened to or formed in one with a ring or sleeve fitting and adapted to slide on the bar. In this way the filling-tongue is held in place on the bar, while it can be moved in one direction or the other at will to keep the parts interlocked, or to permit them to be disengaged from one another, as described.

The nature of my invention and the manner in which the same is or may be carried into effect will readily be understood by reference to the accompanying drawings, in which—

Figure 2:
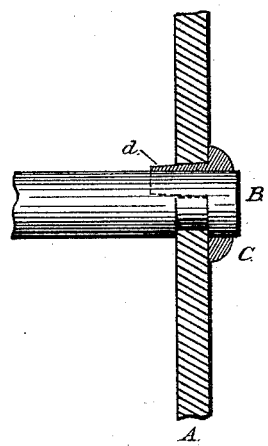
Figure 1:
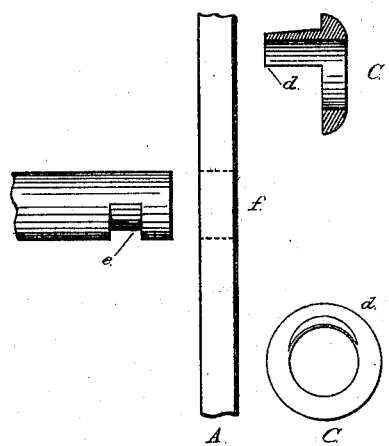
Figure 5:
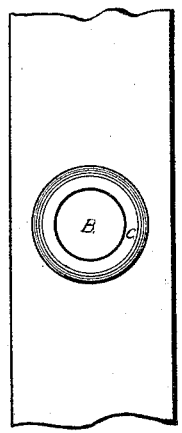
Figure 4:
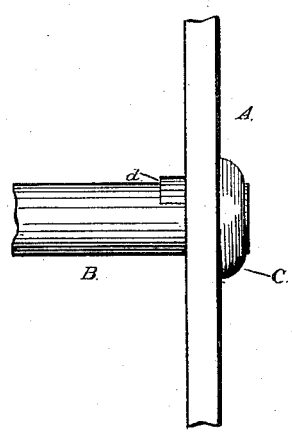
Figure 3:
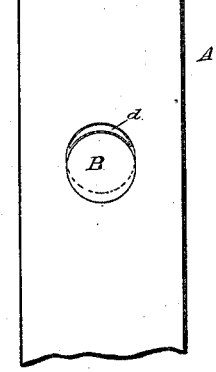

Figure 1 shows the several parts which enter into my invention detached from one another, representing at A a side elevation of a portion of the recessed bar, at B an edge elevation of a portion of the support, and at C two views, respectively in longitudinal central section and in end elevation, of the filling-tongue and its guide sleeve or ring. Fig. 2 is a view, partly in section, and Fig. 4 is an elevation, of the several devices fitted and secured together. Fig. 3 is an elevation, looking at the left-hand face of the support in Fig. 1. Fig. 5 is an elevation, looking at the right-hand face of the support in Fig. 1.

The support A may be supposed to be one of the side supports or rails of a ladder, and the bar B one of the rounds of the ladder. The bar in this instance is of cylindrical form in cross-section, and in the support is formed, as indicated at $f$, a hole of corresponding shape and size to receive one end of the round B. In this portion of the round is formed a lateral recess, $e$, of a width equal to the thickness of the support. The end of the bar is inserted through the hole $f$ in the support until its recessed part $e$ is in the hole, and then the bar is moved so that the portion of the support adjoining the recess shall be caused to enter it. The support is thus embraced between the two shoulders or walls which bound the recess, and the bar and support consequently are interlocked in such manner as to prevent endwise movement of the bar independently of the support. When thus placed, there is a space left between the unrecessed portion of the bar within the hole and the adjoining wall of the latter, and this space I fill by the filling-tongue $d$, which is of a shape to correspond to that of the space, and is also preferably wedge-shaped or tapering, so that it may be jammed as tightly as may be desired into the space between the support and the bar. It is shown thus adjusted in Fig. 2, and so long as it occupies this position it insures the interlocking of the two parts. The tongue is formed in one with or connected to a guide ring or sleeve, C, which is of a shape to encircle and fit upon the bar. In the illustration the filling-tongue is inserted in place from the outer or right-hand face of the support; but it can just as well be inserted from the other face. The ring assures the position of the tongue, and permits it to be readily moved in one direction or the other, as desired.

In the drawings the bar is represented as round, but it can be of course rectangular, polygonal, or of any other desired shape in cross-section, in which case the shape of the tongue, ring, or sleeve and socket or hole would of course be modified to conform to the change.

Having described my invention and the best way known to me of carrying the same into effect, what I claim as new, and desire to secure by Letters Patent, is—

1. The combination of the recessed bar, the support formed with a hole or socket to receive the recessed portion of the bar and the filling-tongue, as and for the purposes hereinbefore set forth.

2. The combination of the recessed bar, the support provided with a hole or socket to receive the recessed portion of the bar, the ring or sleeve fitting and movable upon the bar, and the filling-tongue carried by said sleeve or ring, as and for the purposes hereinbefore set forth.

In testimony whereof I have hereunto set my hand this 15th day of September, 1885.

THOMAS SHEHAN.

Witnesses:
CARRIE REIFSNIDER,
GEORGE P. PHIBBS.